Nov. 10, 1970 C. WEISSENBERG 3,539,732
ELECTRONIC SYSTEM FOR SIGNALING THE ENTRANCE OF CALLS IN MULTILINE TELEPHONE SETS
Filed Sept. 7, 1967
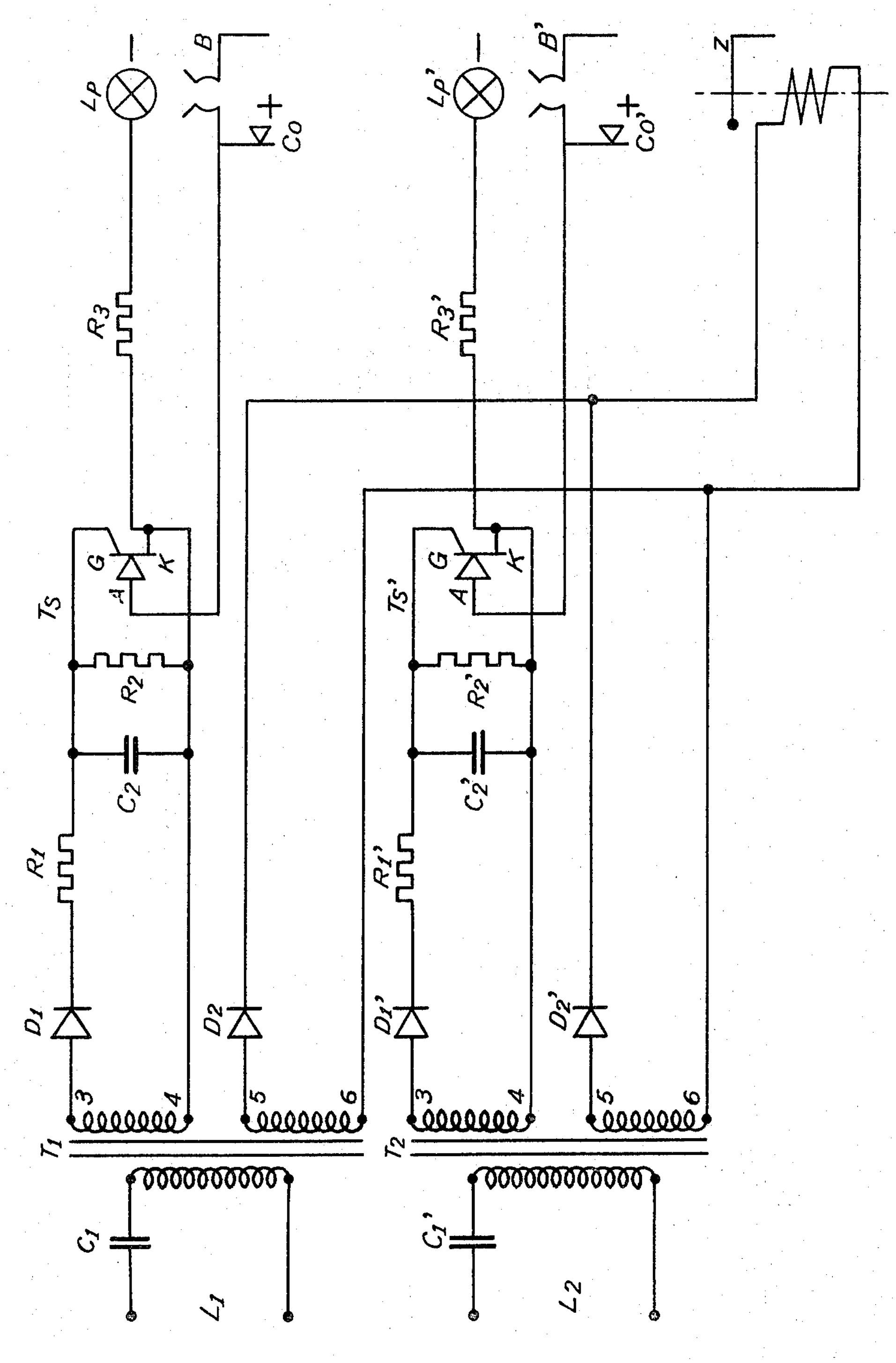

United States Patent Office 3,539,732

Patented Nov. 10, 1970

3,539,732

ELECTRONIC SYSTEM FOR SIGNALING THE ENTRANCE OF TELEPHONE CALLS IN MULTILINE TELEPHONE SETS

Carlos Weissenberg, Calzada de las Aguilas 394, Mexico City 20, Mexico

Filed Sept. 7, 1967, Ser. No. 666,025
Claims priority, application Mexico, Mar. 18, 1967, 94,776
Int. Cl. H04m *1/00, 5/12*
U.S. Cl. 179—99 9 Claims

ABSTRACT OF THE DISCLOSURE

A signaling system for telephone PBX and key systems which comprises a plurality of transformers each having a primary winding to receive a calling signal from a telephone line or circuit, each transformer also having a first secondary winding connected through a diode and a thyristor or silicon controlled rectifier to a telephone key and to individual signaling means for each telephone circuit, each transformer having also a second secondary winding connected through a respective diode to a common signaling alarm means and connected in parallel to the respective second secondary windings of the other transformers. The system is such that when a call is received through any one of the lines, the above mentioned common signaling means will be actuated, together with one of the individual signaling means which will correspond to the telephone key to be operated to answer the call.

The present invention refers to a signaling system for signaling the entrance of a call through the operation of signaling means common to a plurality of telephone keys and the operation of signaling means individually related to each one of the telephone keys and, more particularly, it relates to a signaling system for signaling the entrance of a call in telephone key systems, multiple multiline systems, PBX systems, and other telephone systems, by operating a signaling means corresponding to the telephone circuit through which the call is received and another signaling means common to all the lines connected to the respective telphone sets.

Signaling means for signaling the entrance of a call to any kind of telephone PBX or key system are well known. All the prior art systems, however, suffer from many defects in view of the fact that the signaling action is achieved exclusively by means of the use of electromechanical relays which operate contacts through which the respective signaling circuits are closed. This type of systems require considerable space to be installed and therefore are not very practical. Also, these systems frequently get out of order thereby causing serious difficulties in the maintenance thereof.

On the other hand, the prior art signaling systems are generally built such that a common signaling means is operated by the entrance of a call, but the user cannot easily find out which telephone key has to be operated to answer the call in view of the lack of individual signaling means for each telephone key. While there are systems in the prior art which can operate individual signaling means for each telephone key in order to enable the user to easily find out which of said telephone keys is to be operated to answer a call entering the PBX or key system, these systems have been very complicated and bulky, and are subject to frequent failures in view of the fact that they depend on the use of a plurality of electromechanical means, such as relays, which by their nature are subject to disadjustments and contact failures.

In view of the defects of the prior art signaling systems, it is an object of the present invention to provide a signaling system for telephone key systems which will be of a very simple construction and operation and which will avoid all the disadvantages of the prior art systems.

A further object of the invention is to provide a signaling system for telephone PBX and key systems which will depend on a plurality of solid state devices for the operation of signaling means common to all the telephone keys and individual signaling means for each one of said telephone keys.

A still further object of the invention is to provide a system of the above mentioned character which will have considerably reduced space requirements for a given capacity, will be capable of a very high efficiency and which will have highly reduced maintenance requirements.

A still further object of the invention is to provide a signaling system of the above mentioned character which will completely avoid the use of electromechanical relays for effecting the signaling operations.

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawing, in which:

The figure is a circuit diagram of a telephone key system comprising two lines and two telephone keys, and embodying the signaling system in accordance with the invention.

Having now more particular reference to the drawing, the signaling system built in accordance with the present invention comprises a plurality of telephon lines or circuits $L_1$, $L_2$, a corresponding plurality of capacitors $C_1$, $C'_1$ and a corresponding plurality of transformers $T_1$, $T_2$ each one having a primary winding with taps 1 and 2 to be connected to the corresponding lines $L_1$, $L_2$, and two secondary windings having taps 3, 4 and 5, 6, the secondary windings 5, 6 of each transformer being connected in parallel to each other through a corresponding plurality of diodes $D_2$, $D'_2$ connected to the tap 5 of said secondary windings, said secondary windings being connected to a common call signaling means Z which may comprise a buzzer or any other type of electroacoustic device to be acted upon the reception of a call through any one of the lines $L_1$, $L_2$.

The secondary winding 3, 4 of each transformer is connected in circuit with a diode $D_1$, $D'_1$ connected in series between tap 3 of each secondary winding and a resistor $R_1$, $R'_1$, to a thyristor or silicon controlled rectifier T*s*, T*s*′, which in turn is connected through a resistor $R'_3$, to an individual call signaling means L*p*′ which may comprise a lamp or an electromechanical device, and thence to the negative pole (—) of a suitable battery. The thyristor or silicon controlled rectifier T*s*, T*s*′ is also connected to a telephone key B, having a contact C*o*, C*o*′ connected to the positive pole (+) of said battery. Each circuit includes a capacitor $C_2$, $C'_2$ to absorb transient voltages and a resistor $R_2$, $R'_2$ to avoid overloads, both connected to the gate G and cathode K of each thyristor or silicon controlled rectifier.

The signaling system in accordance with the present invention will signal the entrance of a call received through a line or telephone circuit $L_1$ in the form of an alternate current which passes through the capacitor $C_1$ and primary winding 1, 2 of the transformer $T_1$, thereby inducing a voltage on the secondary winding 3, 4 thereof, said voltage being applied through a diode $D_1$ and resistor $R_1$, to the control electrode G and cathode K of a thyristor or silicon controlled rectifier T*s*, thereby rendering the latter conductive and establishing a closed electrical circuit from the positive pole (+) of a battery, through the contact *Co* of an answering key B of a telephone set, to the anode A of the thyristor or silicon controlled rectifier T*s* and thence through the interior of the thyristor or controlled rectifier, to the cathode K thereof. From this point, the circuit follows through a resistor $R_3$ to an individual signaling means comprising a lamp or an electromechanical indicator L*p* to the negative pole (−) of said battery. The establishment of this electrical circuit will operate the individual signaling means L*p*, thereby individually signaling the entrance of a call through the line or telephone circuit $L_1$.

Upon the operation of the answering key B, the above described circuit is interrupted, thereby cutting off the passage of current to the thyristor or silicon controlled rectifier T*s* which will thus return to the non-conductive state, interrupting the operation of the signaling means L*p*.

In a similar manner, the signaling system according to the invention will signal the entrance of a call received through a line or telephone circuit $L_2$ in the form of an alternating current which passes through the capacitor $C'_1$ and primary winding 1, 2 of the transformer $T_2$, thereby inducing a voltage on the secondary winding 3, 4 thereof, which is applied through the diode $D'_1$ and resistor $R'_1$ to the control electrode G and cathode K of the thyristor or silicon controlled rectifier T*s*′, thereby rendering the latter conductive and establishing a closed electrical circuit from the positive pole (+) of a battery, through the contact *Co*′ of an answering key B′ of a telephone set, to the anode A of the thyristor or silicon controlled rectifier T*s*′, and thence to the cathode K thereof. From here, the circuit follows through a resistor $R'_3$ and the individual signaling means L*p*′, to the negative pole (−) of said battery. The establishment of this circuit will operate the individual signaling means L*p*′, thereby individually signaling the entrance of a call through the line $L_2$.

Upon the operation of the answering key B′, the above described circuit is interrupted, thereby cutting off the passage of current to the thyristor or silicon controlled rectifier T*s*′ which will thus return to the non-conductive state, interrupting the operation of the signaling means L*p*′.

It will be clear from the above that the signaling system of the present invention can be used to operate any number of individual signaling means related to a corresponding number of lines or telephone circuits which bring a calling signal into the system. The addition of more lines to the particular embodiment illustrated in the accompanying drawing will be obvious to any one skilled in the art and therefore a more detailed description of additional lines is considered unnecessary. Each additional line will be arranged exactly in the same manner as lines $L_1$ and $L_2$, and the secondary windings of each additional transformer will be arranged in the circuit in the same manner as in the circuits illustrated in connection with the secondary windings 3, 4 and 5, 6 of transformers $T_1$ and $T_2$ described above. All the additional transformers will have one of the secondary windings thereof connected through diodes in parallel to each other and to the corresponding secondary windings of transformers $T_1$ and $T_2$, thereby enabling the operation of the common signaling means Z, and the other secondary winding of each additional transformer will be connected to additional individual signaling means in the same manner as transformers $T_1$ and $T_2$, so as to actuate said individual signaling means together with the common signaling means such as will be described in the following paragraphs.

The above described signaling system will also signal, by means of a buzzer or any other electroacoustic device, common to several lines, the entrance of a call received through a line or telephone circuit $L_1$ in the form of an alternating current passing through the capacitor $C_1$ and primary winding 1, 2 of the transformer $T_1$, thereby inducing a voltage in the secondary winding 5, 6 thereof. This will originate a pulsing direct current in the circuit formed by said secondary winding 5, 6 of transformer $T_1$, the diode $D_2$ and the signaling means Z common to lines $L_1$ and $L_2$. This pulsing direct current will operate the signaling means Z, which may comprise a buzzer or any other electroacoustic device, thereby indicating the entrance of a call.

In the same manner described above, the system of the present invention will signal the entrance of a call received through a line or telephone circuit $L_2$ in the form of an alternating current which passes through a capacitor $C_1$, and primary winding 1, 2 of the transformer $T_2$, thereby inducing a voltage on winding 5, 6 thereof. This originates a pulsing direct current in the circuit formed by said secondary winding 5, 6 of transformer $T_2$, the diode $D'_2$ and the signaling means Z common to the lines or circuits $L_1$ and $L_2$. This pulsing direct current will operate the signaling means Z, which may comprise a buzzer or any other electroacoustic device, thus indicating the entrance of a call.

The signaling means Z, being common to all the lines or telephone circuits $L_1$ and $L_2$, will be indistinctly actuated to signal the entrance of a call through any one of the lines or telephone circuits $L_1$, $L_2$.

The diode $D_2$, connected in series with the secondary winding 5, 6 of transformer $T_1$, will avoid the back-flow of current from the secondary winding 5, 6 of transformer $T_2$, and the diode $D'_2$ connected in series with the secondary winding 5, 6 of transformer $T_2$, will avoid the back-flow of current from the secondary winding 5, 6 of transformer $T_1$. Therefore, diodes $D_2$ and $D'_2$ will allow the estabishment of a parallel connection of all the secondary windigns 5, 6 with the signaling means Z common to all the lines or telephone circuits $L_1$, $L_2$ and any other lines which may be desired, without the voltage induced in the secondary winding 5, 6 of transformer $T_1$ originating current on the secondary winding 5, 6 of transformer $T_2$ or vice versa. This will prevent the call received through the line or telephone circuit $L_1$ to unduly operate the individual signaling circuit of the line $L_2$, and vice versa, thereby enabling the circuit to comprise a single signaling means Z common to any number of lines.

Resistors $R_1$, $R_2$, $R_3$ and $R'_1$, $R'_2$ and $R'_3$, while not essential to the operation of the signalling system, are very useful to protect the thyristor or silicon controlled rectifier against voltage or current.

Capacitors $C_2$ and $C'_2$, on the other hand, are provided to absorb transient voltages coming from the lines, thereby avoiding an incorrect signaling operation.

From the above it can be seen that a highly simplified signaling system has been provided which can be used in association with telephone switching devices, multipleline telephone sets and other telephonic equipment, in order to signal the entrance of a call by operating an individual signaling means comprising a lamp or an electromechanic indicator associated with each answering key, and also operating a second signaling means which can comprise a buzzer or an electroacoustic device, common to all the lines connected to the telephonic equipment, and effecting the signaling operation by means of solid state devices such as thyristors or silicon controlled rectifiers and diodes, thereby considerably reducing the space, operation and maintenance requirements of an equipment of this kind.

This system is highly advantageous because it eliminates the necessity of using relays, thereby achieving a more economic operation with high safety, practically continuous service characteristics without frequent interruptions for repairs, and a considerable reduction in space requirements.

Although I have shown and described certain specific embodiments of my invention, I am fully aware that many modifications thereof are possible. My invention, therefore, is not to be restricted except insofar as is necessitated by the prior art and by the spirit of the appended claims.

That which is claimed as new is:

1. A signaling system for signaling the entrance of a call into a telephone PBX or key system, which comprises, in combination, a plurality of transformers each having a primary winding connected through a capacitor to a telephone circuit, a first secondary winding connected through a diode and a resistor to a silicon controlled rectifier placed between a telephone key connected to the positive pole of a power source and an individual signaling means connected to the negative pole thereof, such that, when a call is received through said telephone circuit, the silicon controlled rectifier will be rendered conductive to activate the signaling means and thereafter will be rendered non-conductive upon the operation of the telephone key to cut off the signaling means, and a second secondary winding connected in parallel to the second secondary windings of the other transformers through diodes connected in series with each of said windings, all of said second secondary windings being connected to a second signaling means common to all the transformers, such that the entrance of a call through any one of the telephone circuits will operate said common signaling means.

2. A signaling system according to claim 1 wherein one of the ends of said first secondary winding is connected to the control electrode of said silicon controlled rectifier, through a diode and a resistor connected in series therebetween, the other end of said secondary winding being directly connected to the cathode of said silicon controlled rectifier and to said individual signaling means, the anode of said silicon controlled rectifier being connected to said telephone key to complete the circuit between the positive and negative poles of said power source.

3. A signaling system according to claim 2 wherein a capacitor is connected in parallel between the cathode and the control electrode of said silicon controlled rectifier in order to absorb any transient voltage which might be introduced by the corresponding telephone circuit.

4. A signaling system according to claim 3 wherein a resistor is connected in parallel with said capacitor in order to prevent the passage of overload current to said silicon controlled rectifier.

5. A signaling system according to claim 2 wherein a resistor is connected in series between the cathode of said silicon controlled rectifier and said individual signaling means.

6. A signaling system according to claim 1 wherein said individual signaling means comprises a lamp.

7. A signaling system according to claim 1 wherein said individual alarm means comprises an electromechanical device.

8. A signaling system according to claim 1 wherein said common signaling means comprises an electroacoustic device.

9. A signaling system according to claim 1 wherein one of the wires of each of said telephone circuits is connected to the primary winding of said transformers through a capacitor to provide for the passage of alternating current.

References Cited

UNITED STATES PATENTS

| | | |
|---|---|---|
| 3,385,935 | 5/1968 | Anderson et al. |
| 3,406,262 | 10/1968 | Grandstaff. |

RALPH D. BLAKESLEE, Primary Examiner

T. W. BROWN, Assistant Examiner

U.S. Cl. X.R.

179—84